Figure 1:
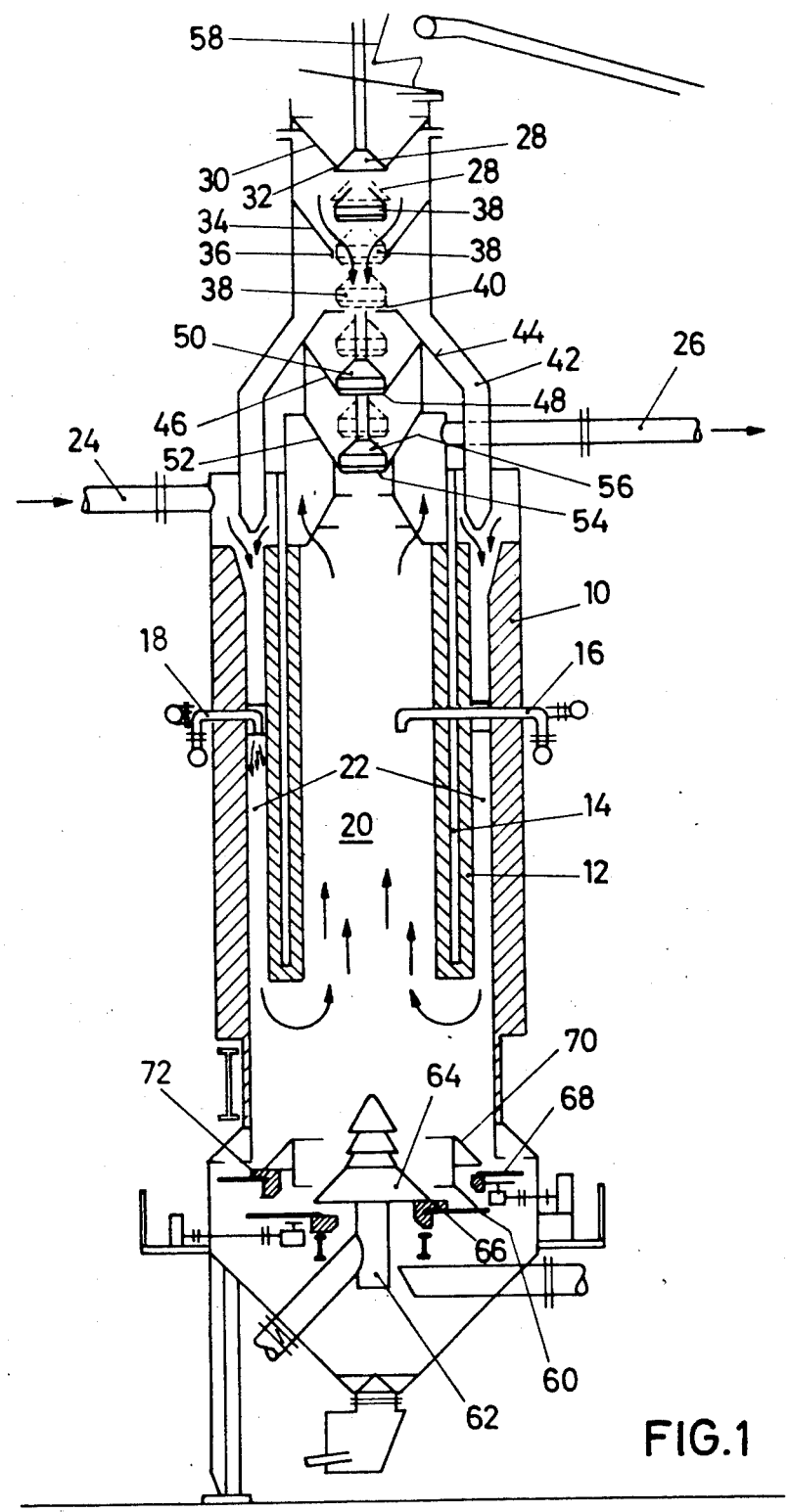

United States Patent [19]

Beckenbach

[11] 4,254,221
[45] Mar. 3, 1981

[54] METHOD OF BURNING LUMP-SIZED COMBUSTIBLE MATERIAL, AND AN ANNULAR SHAFT KILN FOR CARRYING OUT THIS METHOD

[76] Inventor: Karl Beckenbach, Eschenweg 2, 4005 Meerbusch, Fed. Rep. of Germany

[21] Appl. No.: 47,991

[22] Filed: Jun. 13, 1979

[30] Foreign Application Priority Data

Jun. 15, 1978 [DE] Fed. Rep. of Germany ....... 2826167

[51] Int. Cl.³ .......................... F27D 7/00; F27D 1/08
[52] U.S. Cl. ........................................ 432/25; 432/95; 432/96; 432/97; 432/98; 432/177; 432/178
[58] Field of Search .................... 432/25, 26, 95, 96, 432/97, 98, 100, 177, 178

[56] References Cited

U.S. PATENT DOCUMENTS 3,889,393  6/1975  Thomas et al.

FOREIGN PATENT DOCUMENTS 1143432  2/1963  Fed. Rep. of Germany ............. 432/95
1454858  8/1966  France ...................................... 432/95

Primary Examiner—John J. Camby
Attorney, Agent, or Firm—Merriam, Marshall & Bicknell

[57] ABSTRACT

This invention deals with a method of burning crushed or lump-sized combustible material, such as limestone, dolomite, magnesite or a similar material, in an annular shaft kiln having an annular outer shaft and an inner shaft, where the annular and the inner shafts are alternatively charged with fresh air and combustion gases, or are connected with the exhaust gas system. Furthermore, the invention deals with an annular shaft kiln for carrying out this method, which has a shaft insert that is open at the top, whereby the combustion material is selectively fed into the annular shaft formed around the shaft insert, or into the inner shaft which is formed inside the shaft insert. In a first operating position, the inner shaft adjacent its upper end is connected with the exhaust gas system, and combustion gas and combustion air are fed into the outer annular shaft. In a second operating position, the inner shaft is fed with the combustion air and the combustion gas, while the annular shaft adjacent its upper end, is connected to the exhaust gas system. Thus, in the first operating position, the annular shaft has air passed it and the inner shaft has gas flowing through it in counter flow, the flows being parallel, and in the second operating position the annular shaft has gas passed through it in counter flow and the inner shaft has air passed through it in parallel flow.

13 Claims, 2 Drawing Figures

METHOD OF BURNING LUMP-SIZED COMBUSTIBLE MATERIAL, AND AN ANNULAR SHAFT KILN FOR CARRYING OUT THIS METHOD

This invention deals with a method of burning crushed or lump-sized combustible material, such as limestone, dolomite, magnesite, or similar material, in an annular shaft kiln having an annular outer shaft and an inner shaft; as well as an annular shaft kiln having a substantially circular cross-section, for the combustion of lump-sized combustible material, such as limestone, dolomite, magnesite or a similar material having a charging zone, a preheating zone, a combustion zone and a cooling zone. The kiln includes an axially arranged, tubular shaft insert which is open at the bottom, an outer annular shaft which is formed between the shaft insert and the outer kiln wall which is open toward the charging zone which is located above the pre-heating zone, a hollow tubular inner shaft formed within the shaft insert, combustion gas feed lines which are mounted, along the combustion zone, in the kiln wall, and the cooling air supply lines, and also a discharge arrangement at the lower end of the kiln, in order to carry out the above-mentioned method.

Annular shaft kilns of the above-described character, as described in the German Pat. No. 12 14 590 and No. 12 81 111 have performed efficiently in practice. The annular shaft kilns of this type which also include a recuperator for pre-heating the combustion air, function fairly efficiently, and they furnish a faultlessly-burned lime which satisfies the highest demands with respect to being free of carbon dioxide and reactivity. But it has become obvious that a recuperator, which has to be provided in order to obtain a high-grade lime, that is, lime which requires a maximum amount of heat and results in the maximum amount of release of carbon dioxide, may cause certain difficulties in that the individual pipes of the recuperator through which the hot flue gases pass, tend to get clogged. These flue gases contain, depending on the composition of the combustion material, more or less amounts of dust which can be deposited on the inside the pipes and which sometimes is hard to remove. Not only is the removal of the dust difficult and expensive in terms of energy, but the recuperator pipes can also be partially damaged.

The object of this invention is to provide a method and to provide an annular shaft kiln of the type mentioned above where, without the use of a recuperator, the remaining heat of the flue gases can be used to preheat the combustion air.

This problem is solved, according to this invention, by a method wherein the annular shaft and the inner shaft are respectively first charged with fresh air and combustion gases, and then are connected with the exhaust gas system.

The annular shaft kiln according to this invention is distinguished in that the shaft insert is open at the top; in that the feeding zone has a device for selectively supplying the combustion material to the outer annular shaft on the one hand, and then, on the other hand, into the inner shaft; in that a first part of the combustion gas supply system extends into the outer annular shaft and a second part extends into the inner shaft; and in that when in a first operating condition, the annular shaft, close to its top end, is chargeable with combustion air and combustion gas supply lines opening only into the annular shaft are chargeable with combustion gas and wherein the inner shaft adjacent its upper end is connected with the exhaust gas line, whereas a second operating condition, the inner shaft adjacent to its upper end is chargeable with combustion air, and the combustion gas supply lines opening only into the inner shaft are chargeable with combustion gas, whereby the annular shaft adjacent its upper end is connected with the exhaust gas line, whereby in the first operating condition the annular shaft has parallel flow through and the inner shaft has counter flow through, and in the second operating position the annular shaft has counter flow through and the inner shaft has parallel flow through by air or exhaust gas respectively.

A particular embodiment of the annular shaft kiln according to the invention provides, furthermore that the charge zone, seen from the charge opening for the combustion material which is located at the top has consecutively, arranged at vertical spacings, a first pan which slopes downwardly from the kiln wall, this pan having a first central opening; a second pan having a second central opening under which an annular feeding chamber is located that slopes outwardly and downwardly in all directions, and opens into the annular shaft, the sliding area of the annular feeding chamber being terminated, at the top by a circular center opening; that below this center opening at a distance, a third pan is arranged having a third central opening, in that below this, a fourth pan is located having a fourth central opening above the inner shaft; a bell-type feeder which may be lowered or raised between a first position where it seals the first central opening against combustion material, and a second position where it releases the combustion material from the first pan to the second pan; a bell-type guide which may be raised from a first position where it seals the second central opening substantially against combustion material, up to a second position within the volume of the second pan and down to a third position where it seals the center opening against the combustion material; a first bell-type sluice which seals the third central opening against combustion material and gases and is raisable from the first position to a second position within the volume of the third pan, and a second bell-type sluice which seals the fourth central opening against combustion material and gases and is raisable from a first position to a second position within the volume of the fourth pan, whereby the diameter of the center opening is equal to or less than the diameter of the second center opening.

A further development of the invention resides in a first stationary discharge table below the bottom rim of the shaft on which the material moving down from the inner shaft heaps up, a first deflecting member which moves the deflected material over the edge of the first discharge table, the first deflecting member being centrally located and including a first distribution member of substantially conical shape, and further including a discharger rod projecting radially outwardly directly above the first discharge table; a second stationary discharge table of annular shape concentrically located and spaced from the first discharge table, on which the burned material generally coming exclusively from the annular shaft is heaped up, and a second deflecting member which moves the deflected material over the edge of the second discharge table, this deflecting member being centrally located and including a generally truncated guide area; and a second discharger rod located closely above the second discharge table and projecting radially outwardly whereby the two discharger rods alternately are pivotable for discharging the burned material coming either from the inner shaft or the annular shaft.

The inventive idea generally consists in that the annular shaft kiln according to the invention uses the principle of regenerative prewarming, for the prewarming of the combustion air whereby the inner shaft and the outer shaft, alternately, from top to bottom or from bottom to the top, that is in parallel or counter flow, have the air or the gases passed through them. The principle of regenerative prewarming as well as its application when limestone is burned, have been known in other kiln designs (e.g. DE-PS No. 11 57 133). However, in those designs, at least two shafts, independent of one another, are necessary for the process, while in the annular shaft kiln according to this invention, only one single kiln shaft is provided which is subdivided by a cylindrical shaft insert, which has a refractory lining inside and out, this insert projecting from the top far enough into the kiln that a substantial part of the combustion zone can be formed between the cylindrical inner area of the kiln wall and the outer area of the shaft insert, and, into the inner shaft and the outer shaft, the outer shaft being concentric with inner shaft. This design is substantially less expensive than the other known kiln designs having regenerative prewarming. With the aid of the combustion material itself, in the annular shaft kiln according to the invention, the heat surplus contained in the prewarming area is additionally used for prewarming the combustion air. No recuperator is necessary. The heat surplus of the flue gasses is thus used to a maximum extent for prewarming the air. The excess heat of the flue gases which pass through the prewarming zones and leave these zones at the higher flue gas temperature, is advantageously used to prewarm another medium necessary for the process, namely the combustion air. The arrangement of one shaft, instead of several shafts also has the advantage of saving heat since only one kiln shaft is exposed to the outside cooling air.

In the annular shaft kiln according to the invention, the combustion or flue gases respectively pass through a substantial part of the combustion zone in parallel flow and then pass, after they have given off the major part of the heat content, upon mixing with the lime cooling air, which comes from below, at a decreased temperature (between about 1000° C. and about 900° C.), the remaining combustion zone, thus resulting in another advantage according to this method.

The charging zone of the annular shaft kiln according to the invention is so designed, as stated above, that, alternately, the inner shaft and the outer annular shaft are fed with the same weight of combustion material. Preferably the tubular shaft insert is hung from its upper end at the top above the prewarming area by means of heavy roof-shaped supports from the kiln wall so that the lower end of the shaft insert is completely free of supports, and when this arrangement is provided there is another considerable advantage as compared with known lime-kiln design having regenerative prewarming. That is the flue gases can flow freely without the aid of any special device from the inner shaft to the outer annular shaft or from the annular shaft to the inner shaft, and they can distribute evenly by following the natural flow characteristic without hinderance from any built-in devices. The considerable difficulties which occur in the known lime kiln designs having regenerative prewarming, arising from the fact that the flue gases have been gathered in one annular chamber and thereafter enter another shaft, do not occur at all in the annular shaft kiln according to this invention, since no annular collecting chamber having a refractory construction is necessary for that purpose. Also, such annular collecting chambers, which are not required in an annular shaft kiln according to this invention, have the tendency of depositing dust and need to be cleaned often, which is expensive.

The shaft kiln according to this invention can be so discharged that the inner shaft and the annular shaft simultaneously, or either the annular shaft or the inner shaft separately, can be emptied. In order to be able advantageously to discharge equal amounts each time, stock-line indicators are provided at the throat which, via governing motors, render possible such a governed activation of the two discharging devices that are provided so that equal amounts of burned material can be discharged from the annular shaft and from the inner shaft. The discharge arrangements can be designed substantially as is known from the German patent DE-PS No. 12 73 750 to which we refer for details.

The feeding device of the annular shaft kiln according to the invention, in addition, generally has two sluice systems as has been previously briefly mentioned, which serve, on the one hand, to seal the kiln, which is under suction from the outside atmosphere, and, on the other hand, serve to prevent gas flow between the annular shaft and the inner shaft in the area of the feeding zone. Hereby, the bell-type feeder described in the preferred embodiment of the invention, together with a lid located above said feeder form a first sluice which separates the kiln interior from the outside. The first and second bell-type feeders form a sluice system, which, in the kiln head, separates the different gas conditions of the two shafts from one another and thus prevents a shortcircuit of combustion air and fresh air, on the other hand, and flue and exhaust gas on the other hand.

Figure 2:
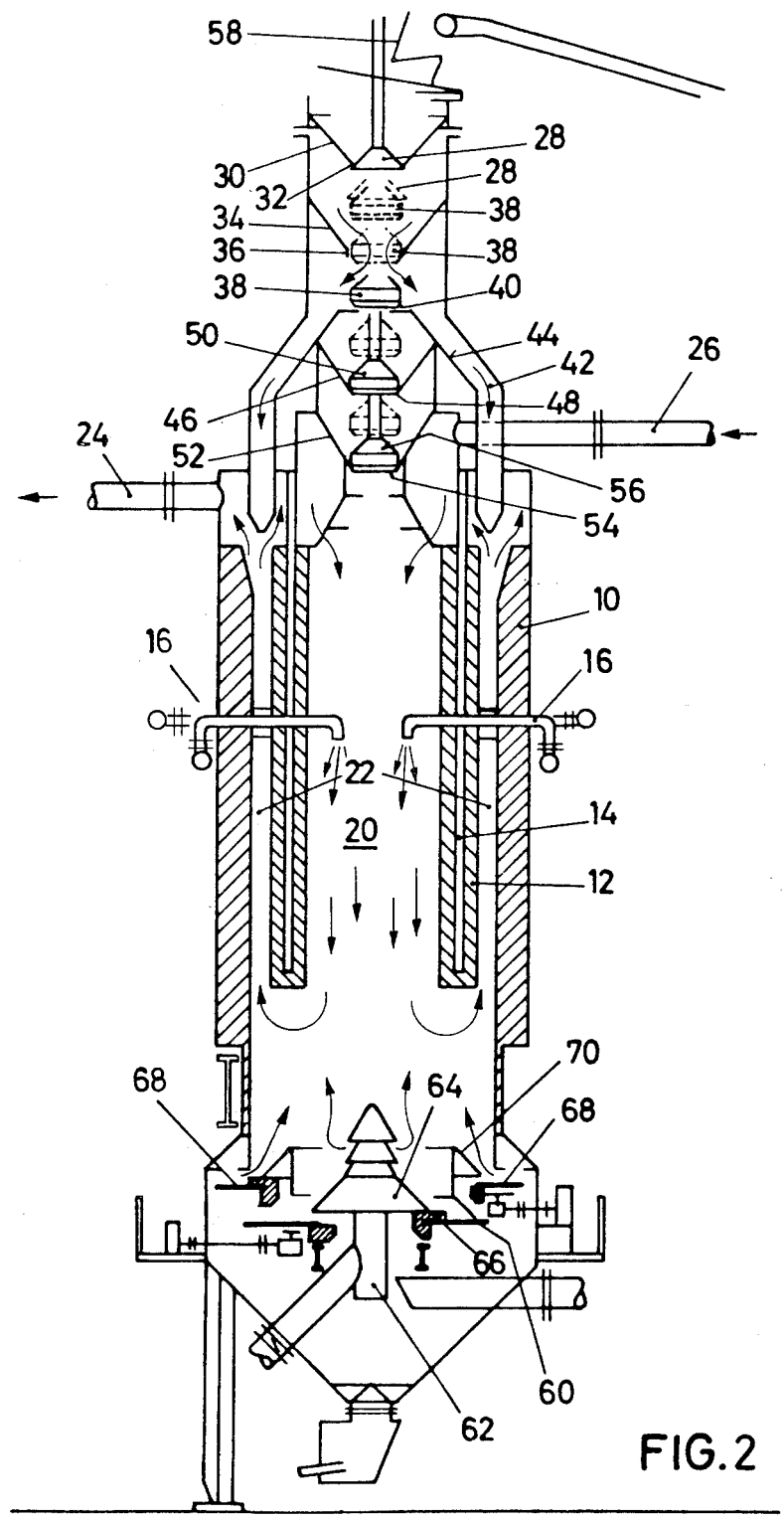

Further characteristics and advantages are revealed in the claims and the subsequent description in which one example of the invention is explained in detail with the aid of the drawing in which FIG. 1 shows an annular shaft kiln according to the invention in longitudinal section through a first plane containing the longitudinal axis of the kiln, in its first operating position, and FIG. 2 shows an annular shaft kiln of FIG. 1 in longitudinal section in a second plane that contains the kiln's longitudinal axis, in its second operating position.

As shown in FIG. 1, the annular shaft kiln according to the embodiment of the invention shown therein, has a cylindrical kiln wall 10 within which, concentrically with it, also is provided a cylindrical shaft insert 12. The shaft insert 12, in the embodiment shown, is suspended by means of heavy supports, the ends of which rest on the kiln wall 10 so that its lower part, which is defined by the kiln wall 10 of the annular shaft kiln, is completely free from any support. Furthermore, the drawing shows that the shaft insert 12 is provided as a hollow shell or sleeve and forms an annular tunnel or passage 14 which is closed at the bottom and the tunnel 14 has combustion air passed therethrough which thus is advantageously warmed up. Of course, the inner surface area of the kiln wall 10 as well as the inner and outer cylinder areas of the shaft inserts 12 are clad with refractory material.

Through kiln wall 10, as shown in FIG. 1, a number of lances or ducts 16, 18 are provided which serve to feed combustion or heating gases, some of which penetrate the wall of the shaft insert 12 and end in an inner shaft 20 which is formed by and within the shaft insert 12, and some of which only penetrate the kiln wall 10 and end in an annular shaft 22 which is formed between the kiln wall 10 and the shaft insert 12.

In FIG. 2, where the longitudinal section passes through another plane which contains the kiln's longitudinal axis, only two lances or ducts 16 of the first mentioned type are seen. However, it is obvious that in the inner shaft 20 as well as in the annular shaft 22, several lances or ducts 16, 18 are evenly distributed over the kiln circumference, which can be charged with combustion gases and which will be described later on. The lances 16 are located in the annular shaft kiln, according to the invention, at about the level of the transition from the preheating zone to the combustion zone, and this heating zone, as viewed from above, adjoins the mentioned feeding zone. Since, therefore, the lances are located in a kiln zone having a temperature of about 800° C., they must be relatively refractory, e.g., they consist of sicromal, and, if necessary, they can be cooled by the air circulating around the gas feeding line, which air can initiate the combustion of the combustion gases. Not only is it possible to design the lances 16, 18, as shown in the drawing where they penetrate the kiln wall 10, but in addition, the lances, especially those opening into innter shaft 20, can also be fastened to parts of the feeding device and can be inserted into the kiln from the top.

Furthermore, the drawing shows that at the upper end of the feeding zone, starting about above the level of the lances 16, 18 and extending upwardly into the area of the feeding zone which defines the feeding device and is explained later on, the annular shaft 22, on the one hand, and the inner shaft 20, on the other hand, are connected to a gas line 24 or 26 the operation of which will be explained later on. The feeding device has a bell-type feeder or charger 28 which is vertically adjustable and is shown in the drawing in its withdrawn or closed upper position in which it closes or seals a first pan 30 against combustion material, this pan projecting inwardly from the kiln wall and sloping downwardly and having a central opening 32. This bell-type feeder 28 can be lowered to a second lower position which is indicated in dashed lines in FIG. 1 of the drawing, and in this lowered position, the first mentioned central opening 32 is opened. Under the first pan 30 is mounted a second pan 34 having a second central opening 36. The second central opening 36 can be sealed against combustion material by a bell-type guide 38 when the guide 38 is in its center position. From the illustrated center closed position, the bell-type guide 38 can be moved to an upper position where it is within the volume of the second pan 34; in this second upper position shown by the solid line position of the guide 38, the second central opening is made open. Furthermore, the bell-type guide 38 can be lowered from the center closed position to the lower position shown in the drawing where it adjoins and seals a center opening 40 against combustion material. From the opening 40 an annular feeding chamber 42 is formed which first slopes downwardly and outwardly and then vertically downwardly, and ends in the annular shaft 22 which is open at the top. Below a sloping sliding surface area 44 of the annular feeding chamber 42 and below the center opening 40 there is a third pan 46 with a third central opening 48 which can be sealed against combustion material and combustion gas by means of a first bell-type sluice 50 which either can be lowered or raised. Below the third pan 46 there is a fourth pan 52 with a fourth central opening 54, and the latter can be sealed from the combustion material and the combustion gases by a second bell-type sluice 56. In the drawing the two bell-type sluices 50 and 56 are shown in solid lines in their respective lowered position where they seal the third central opening 48 and the fourth central opening 54, while the raised or open position of the two bell-type sluices are shown in dashed lines. Above the upper pan 30 and the bell-type feeder 28, a second lid 58, which can be closed, is provided.

At the lower end of the annular shaft kiln, as shown in the illustration, is provided a first stationary discharge table 60, the diameter of which is so designed that the outer rim of the table extends approximately to the center of the annular shaft 22. At the upper end of a stationary vertical pipe 62, a deflecting or distribution cone 64 is fastened, to which air is fed through the pipe 62; this cone 64 has, at its lower end, closely above the first discharge table 60, a first cam-type discharger rod 66 which is connected with a rotary drive. Upon rotation of the discharger rod 66, the burned material piling onto the first discharge table and substantially sliding downwardly from the inner shaft 20, is pushed over the rim of the first discharge table 60. If necessary, the distribution cone 64 can have openings (which are not illustrated) for the air which is fed through pipe 62.

At a distance above the first discharge table 60, there is a stationary second discharge table 68 which is ring-shaped and which, seen from the kiln wall, extends far enough inwardly that it overlaps the first discharge table 60. Above the second discharge table 68 there is arranged a stationary, truncated, cone-shaped deflecting or guiding area 70. A pivotable second discharger rod 72 pushes the burned, piled up material from the second discharge table 68, which generally comes from the annular shaft 22, outwardly over the rim of the second discharge table 68.

The annular shaft kiln, according to the invention, as shown in the illustration, operates as follows:

In the operating position, as shown in FIG. 1, the gas line 24 is switched to operate as a combustion air supply, and the gas line 26 is switched to operate as a flue gas exhaust. The lances 16 are switched off while the lances 18 leading into annular shaft 22 are charged with combustion gases. The bell-type charger 28 or the lid 58, and at least one of the bell-type sluices 50 and 56, are in their closed position, whereby the annular shaft 22 and the charger or feeding chamber 42, respectively, are sealed against the outside air on the one hand, and, on the other hand, are separated from the inner shaft 20. Cooling air is supplied to the annular shaft kiln from below as mentioned.

Thus, the following flow conditions result: The combustion air from line 24 flows in parallel paths through the preheating zone of the annular shaft 22, which is above the level of the lances 16, 18, and flows through the combustion area which extends downwardly from the level of the lances 16, 18 in the annular chamber 22 and the air is heated by the burning of the combustion gases or heating gases. From the lower end of the annular shaft 22, the flue gases, together with the cooling air supplied from below, rise in counter flow through the inner shaft 20 and are carried off through the gas line 26, whereby a smaller part of the combustion zone, which, in this operating position, is substantially below the level of the lances 16, 18 within the annular shaft 22, extends, still in counter flow, into the inner shaft 20. The flue gases as well as the rising cooling air hereby heat the combustion material which is located above the level of the lances 16, 18; of course, the lances 16 have remained switched off as previously stated. The remaining air flow and the gas flow take place in the manner shown schematically in FIG. 1 by the arrows.

When the kiln has been operated for a certain period of time in the operating position described and shown in FIG. 1, a switchover takes place to the operating position or manner of operation shown in FIG. 2, where, instead of the lances 18, the lances 16 exclusively, which extend into the inner shaft 20, are charged with combustion gases. The line 24 is switched to operate as a flue gas exhaust and the line 26 is switched to operate as combustion air supply. The sealing functions by means of the various bells in the charging zone is identical to that explained in connection with FIG. 1. Now the combustion material, at the position corresponding to the bell-shaped guide 38, has to be guided into the inner shaft 20 as will be explained later. In this operating condition, the combustion air supplied by the gas line 26 flows through the strongly heated prewarming zone, which was heated during the operation shown in FIG. 1, the prewarming zone being located above the level of the lances 16, 18, and thus the heated combustion air arrives at the level of the lances 16. From there the substantial part of the combustion zone within the inner shaft 20 extends downwardly, again in parallel flow, from where the flue gases then rise through the annular shaft 22. A smaller part of the combustion zone again lies within the lower end of the annular shaft 22, thus strongly warming the combustion material located in the zone at the upper part of said shaft 22, respectively. After a period in this operating position the kiln is switched back to the condition shown in FIG. 1.

By alternately using the operating positions shown in FIG. 1, and the one shown in FIG. 2, a most advantageous regenerative prewarming of the combustion air results, whereby the heat surplus in each condition of operation is made use of and used up in the next operating condition.

The charging of the annular shaft kiln according to the invention is accomplished in a manner that, at first when the bell-type charger 28 is moved upwardly and closed, the lid 58 is open and a combustion charge is provided into the first pan 30. Thereupon, with the bell-type guide 38 where it closes the central opening 36 of the second pan 34 the bell-type feeder 28 is lowered to the lower position, which is shown in the dashed lines, the lid 58 having been closed in the meantime, so that the material supplied into the first pan 30 can now move down to the second pan 34. If the combustion charge is to be fed to the central innershaft 20, then, with the first bell-type sluice 50 displaced downward to the closed position, the bell-shape guide 38 is raised from the central position, where it seals the second central opening 36 of the second pan 34, upwardly to the upper position, whereby the combustion charge which is in the second pan 34 falls through the second central opening 36 and through the center opening 40 and into the third pan 46. The subsequent raising up of the first bell-type sluice 50, the second sluice 54 sealing the opening 54 of the fourth pan, causes the combustion charge to move from the third pan 46 into the fourth pan 52. Then the bell-type sluice 50 is lowered into the lower position, as shown in the solid line position, which seals the fourth central opening 48 combustion material-tight and gas-tight. Then the second bell-shaped sluice 56 is raised into the upper dashed line position illustrated in the drawing, from where the combustion charge, which has arrived at the pan 52, falls into the inner shaft 20.

On the other hand, if the annular shaft 22 is to be charged, then the bell-type guide 38 is moved from the center position where it seals the second central opening 36, to the lower position where it covers the center opening 40 of the annular feeding chamber 42. Thus, the combustion charge fed into the second pan 34 arrives directly in the feeding chamber 42 and slides along the sliding surface area 44 and is fed into the annular shaft 22.

The discharger rods 72 and 66 are preferably operated alternately whereby the burned material from the annular shaft area 22 and from the inner shaft area 20, respectively, are discharged. Of course, care should be taken that a corresponding amount of combustion material is fed into the annular shaft 22, on the one hand, and into the inner shaft 20, on the other hand. This can be assured by a stock line indicator (not shown) provided at the throat, which is not shown, from which it can be ascertained, upon activating the second discharge rod 72 or the first discharge rod 66, what amounts have been discharged from the kiln, so that a corresponding amount of feeding can take place. In other words, the combustion material amounts which are supplied to the inner shaft 20, on the one hand, and to the annular shaft 22, on the other hand, are kept the same as the amounts of combustion material discharged from the two shafts.

The characteristics of the invention revealed in the above description, in the drawing, as well as in the claims, can be substantial, individually as well as in any combination, for the realization of the invention in their various embodiments.

What is claimed is:

1. Method of burning crushed combustion material, such as limestone, dolomite, magnesite or a similar material, in an annular shaft kiln having generally concentric annular outer shaft and inner shaft, an exhaust gas system, a first line connected to the outer shaft and a second line connected to the inner shaft, and combustion gas sources connected to said outer and inner shafts, comprising the steps of charging said outer and said inner shafts with said material, and alternately supplying fresh air to said first line and combustion gases to said outer chamber and connecting said second line with the exhaust gas system and then supplying fresh air to said second line and combustion gas to said inner chamber and connecting said first line with the exhaust gas system.

2. Method according to claim 1, and further including the steps of alternately discharging from the outer shaft and the inner shaft amounts of the material and alternately feeding the outer shaft and the inner shaft with combustion material.

3. Method according to claim 1, and further including the step of simultaneously discharging from the outer shaft and the inner shaft the burned material.

4. An annular generally vertical shaft kiln for burning crushed combustion material, such as limestone, dolomite, magnesite or a similar material, having a charging zone, a prewarming zone, a combustion zone, and a cooling zone, comprising a kiln wall having a generally circular cross-section, an axially arranged tubular shaft insert which is open at the bottom and is mounted within said kiln wall, an annular shaft arranged between the shaft insert and said kiln wall and open towards the charging zone which is located above the prewarming zone, a pipe-shaped inner shaft formed within the shaft insert, an exhaust gas system, combustion gas feed lines and combustion air feed lines arranged along the combustion zone in the kiln wall as well as a discharge arrangement at the lower kiln end, said shaft insert 12 being open at the top, said charging zone having a device for selectively charging the combustion material into the annular shaft on the one hand, and, on the other hand, into the inner shaft, said combustion feed lines opening into the annular shaft and opening into the inner shaft, and means controlling said combustion gas feed lines, said combustion air feed lines, and said exhaust gas system whereby in a first operating position, the annular shaft is chargeable with combustion air and in that the combustion gas feed lines open only into the annular shaft and are chargeable with combustion gas, and the inner shaft adjacent its upper end is in connection with an exhaust gas system, while, in a second operating position, the inner shaft adjacent its upper end is chargeable with combustion air and the gas feed lines which open only into the inner shaft are chargeable with combustion gas, and the annular shaft close to its upper end is in connection with the exhaust gas system whereby, in said first operating position, the annular shaft has parallel flow-through and the inner shaft has counter flow-through and, in the second operating position, the annular shaft has counter flow-through and the inner shaft has parallel flow-through by air or gas respectively.

5. Annular shaft kiln according to claim 4, including means adjacent the upper end of said kiln for suspending the shaft insert in the kiln wall.

6. Annular shaft kiln according to claim 4 or 5, wherein said shaft insert is connected with said kiln wall by means of radial ribs which are roof-shaped and gradually enlarge outwardly and are arranged above said combustion gas feed lines.

7. Annular shaft kiln according to claim 4 or 5, wherein said shaft insert is designed as a hollow sheathing and forms an annular tunnel which is coolable by the combustion air which is thus warmed up.

8. Annular shaft kiln according to claim 4 or 5, wherein at least one part of the combustion gas feed lines consists of lances.

9. Annular shaft kiln according to claim 8, wherein at least a portion of said lances extend laterally through at least one of the kiln wall and the wall of the shaft insert.

10. Annular shaft kiln according to claim 8, wherein at least a part of said lances are inserted from above into the respective shafts.

11. Annular shaft kiln according to claim 4 or 5, wherein said charging zone includes a feed opening located at the top of the kiln for receiving the combustion material, and comprises at consecutively spaced vertical distances: a first pan protruding from said kiln wall and sloping downwardly with a first central opening; a second pan having a second central opening; an annular feeding chamber beneath said second central opening, said annular feeding chamber sloping outwardly and downwardly in all directions and ending in said annular shaft, the sloping area of said annular feeding chamber which defines at the top a circular center opening; a third pan arranged at a distance below said circular center opening, said third pan having a third central opening; below said third pan a fourth pan having a fourth central opening adjacent said inner shaft; a bell-type feeder raisable and lowerable between a first position sealing said first central opening against combustion material, and between a second position releasing the combustion material supply from the first pan into the second pan; a bell-type guide raisable from a first position where it seals substantially combustion-tight said second central opening into a second position within the volume of said second pan and lowerable into a third position sealing said circular center opening substantially combustion-tight; a first bell-type sluice raisable from a first position where it seals said third central opening combustion material-tight and gas-tight, into a second position within the volume of the third pan; and a second bell-type sluice raisable from a first position, where it seals the fourth central opening combustion material-tight and gas-tight, into a second position within the volume of said fourth pan, whereby the diameter of said circular center opening is equal to or less than the diameter of the second central opening.

12. Annular shaft kiln according to claim 4 or 5 wherein below said shaft insert is arranged: a first stationary discharge table on which the burned material coming generally from said inner shaft heaps up, a first centrally arranged deflecting member having a substantially conical first distributing body which pushes deflected material over the rim of said first stationary discharge table; and a first discharge rod closely above said first stationary discharge table and extending from said first stationary discharge table radially outwardly; a second annular-shaped stationary discharge table located concentrically at a distance to said first discharge table on which second table the burned material heaps up coming generally from said annular shaft; and a second centrally located deflecting member having a substantially truncated cone guide area pushing the deflected material over the rim of the second discharge table; and a second discharge rod arranged closely above the second discharge table and projecting radially outwardly, whereby the two discharge rods alternately are rotatable for discharging the burned material coming from the inner shaft or from the annular shaft, respectively.

13. Method according to claim 1, and further including the step of alternately charging the outer shaft and the inner shaft with said material.

* * * * *